United States Patent
Cho et al.

(10) Patent No.: US 10,003,723 B2
(45) Date of Patent: Jun. 19, 2018

(54) CAMERA MODULE INCLUDING LENS MODULE ACTUATOR

(71) Applicant: SAMSUNG ELECTRO-MECHANICS CO., LTD., Suwon-si (KR)

(72) Inventors: Yong Wan Cho, Suwon-si (KR); Byung Hoon Lee, Suwon-si (KR); Sang Ho Seo, Suwon-si (KR); Jae Ho Baik, Suwon-si (KR); Shin Young Cheong, Suwon-si (KR); Hyun Taek Ahn, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 9 days.

(21) Appl. No.: 15/007,994

(22) Filed: Jan. 27, 2016

(65) Prior Publication Data

US 2016/0344919 A1 Nov. 24, 2016

(30) Foreign Application Priority Data

May 20, 2015 (KR) ........................ 10-2015-0070609

(51) Int. Cl.
 *H04N 5/225* (2006.01)
 *G02B 7/08* (2006.01)
(52) U.S. Cl.
 CPC ............. *H04N 5/2254* (2013.01); *G02B 7/08* (2013.01); *H04N 5/2253* (2013.01)
(58) Field of Classification Search
 CPC ....... H04N 5/2254; H04N 5/2253; G02B 7/08
 See application file for complete search history.

(56) References Cited

U.S. PATENT DOCUMENTS

| | | | | |
|---|---|---|---|---|
| 2009/0252488 A1* | 10/2009 | Eromaki | ................ | G02B 7/102 396/529 |
| 2010/0182490 A1* | 7/2010 | Seol | ......................... | G02B 7/08 348/345 |
| 2014/0160311 A1 | 6/2014 | Hwang et al. | | |
| 2014/0362284 A1* | 12/2014 | Shin | ..................... | G02B 27/646 348/373 |
| 2015/0049209 A1* | 2/2015 | Hwang | .............. | H04N 5/23287 348/208.11 |

FOREIGN PATENT DOCUMENTS

| | | |
|---|---|---|
| KR | 10-0952620 B1 | 4/2010 |
| KR | 10-2014-0002381 S | 1/2014 |
| KR | 10-2014-0076213 A | 6/2014 |
| KR | 10-2014-0142189 A | 12/2014 |
| WO | WO 2014/003281 A1 | 1/2014 |

OTHER PUBLICATIONS

Korean Office Action dated Jun. 21, 2017 in corresponding Korean Patent Application No. 10-2015-0173855. (8 pages in English and 6 pages in Korean).

* cited by examiner

*Primary Examiner* — Hung Lam
(74) *Attorney, Agent, or Firm* — NSIP Law

(57) ABSTRACT

A camera module includes a coil member, a magnet member, and a sensor member. The coil member is positioned on a first surface of a fixed unit. The magnet member is positioned on a movable unit and facing the coil member. The sensor member is positioned on a second surface of the fixed unit and configured to sense a position of the movable unit.

15 Claims, 17 Drawing Sheets

A-A

CAMERA MODULE INCLUDING LENS MODULE ACTUATOR

CROSS-REFERENCE TO RELATED APPLICATION

This application claims the priority and benefit under 35 USC 119(a) of Korean Patent Application No. 10-2015-0070609 filed on May 20, 2015, with the Korean Intellectual Property Office, the disclosure of which is incorporated herein by reference for all purposes.

BACKGROUND

1. Field

The following description relates to a camera module having an auto-focusing function.

2. Description of Related Art

A camera module is mounted in a portable electronic device, such as a mobile phone.

The camera module has an auto-focusing function. As an example, the camera module includes an actuator adjusting a position of a lens module depending on a distance from a subject.

Ideally, the camera module is minimized in order to be adequately mounted in the portable electronic devices. However, in a mobile phone, additional components to the camera module are integrated in a narrow space, thus making it difficult to install the camera module.

Therefore, a camera module is needed that can be easily mounted in compact electronic devices such as mobile phones.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a camera module, including: a coil member positioned on a first surface of a fixed unit; a magnet member positioned on a movable unit and facing the coil member; and a sensor member positioned on a second surface of the fixed unit and configured to sense a position of the movable unit.

The first and second surfaces may be orthogonal to each other.

A fitting window into which the sensor member is fitted may be formed on the second surface of the fixed unit.

The sensor member may include terminals extended in one direction.

The sensor member may include a protrusion part coupled to the fixed unit.

The camera module may further include a magnetic body positioned on the movable unit configured to face the sensor member.

The camera module may further include an image sensor unit configured to convert an optical signal incident through lenses of the movable unit into an electrical signal.

In accordance with an embodiment, there is provided a camera module, including: a fixed unit including a coupling window formed on a first side surface thereof and including a fitting window formed on a second side surface thereof, wherein the fixed unit may include a space in which a movable unit is accommodated; an actuator unit configured to move the movable unit in an optical axis direction; a substrate unit positioned in the coupling window and including a coil member of the actuator unit positioned thereon; and a sensor member positioned in the fitting window and configured to sense a movement position of the movable unit.

The first and second side surfaces may be orthogonal to each other in the fixed units.

The first and second side surfaces may be adjacent to each other in the fixed unit.

The first and second side surfaces may be opposite to each other in the fixed unit.

The camera module may further include a magnetic body positioned on the movable unit and configured to generate a magnetic force line sensed by the sensor member.

The sensor member may include a sensor body, terminals extended from the sensor body, and a fitting protrusion extended from the sensor body in a direction perpendicular to the terminals.

The sensor member may be positioned at a same height as that of a magnet member of the actuator unit.

The camera module may further include an image sensor unit connected to the sensor member.

In accordance with an embodiment, there is provided a camera module, including: a substrate unit including a body part including a coil member and connection pads, a cover part, and a separation groove positioned between the body part and the cover part, wherein the cover part is configured to insulate the coil member and configured to fold on the body part in relation to the separation groove and cover a portion of the body part; and a magnet member disposed on a movable unit and configured to face the coil member, wherein a position of the movable unit is aligned by the coil member and the magnet member.

The position of the movable unit in an X axis direction, perpendicular to an optical axis, may be aligned by the coil member and the magnet member.

The camera module may further include a fixed unit configured to accommodate the movable unit therein, and may include a coupling window formed on one side surface of the fixed unit and configured to receive the magnet member and to enable the magnet member to face the coil member, and a sensor member, wherein the position of the movable unit in a Y axis direction, perpendicular to the optical axis and the X axis direction, is aligned.

The coil member may be positioned on a first surface of the substrate unit, and a printed circuit and connection pads may be formed on a second surface of the substrate unit.

The substrate unit may include a resin layer, a metal layer, and a protecting layer, wherein the resin layer may form a core of the substrate unit, the metal layer may be formed on a surface of the resin layer to form the connection pads, and the protecting layer may be formed on the second surface of the substrate unit, and covers the metal layer to prevent most of the metal layer from being exposed.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which.

Figure 1:
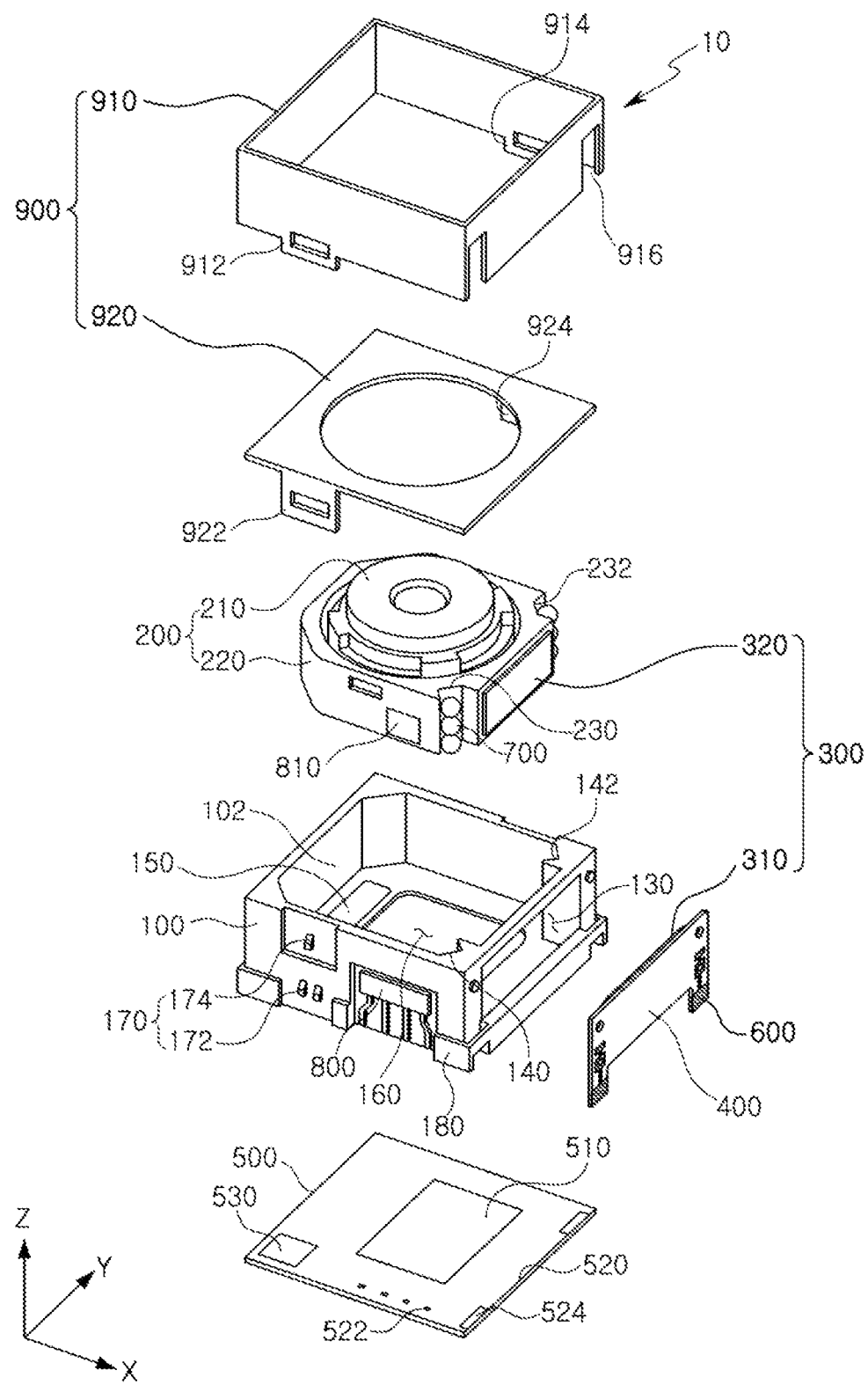
FIG. 1 is an exploded perspective view of a camera module, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Unless otherwise defined, all terms, including technical terms and scientific terms, used herein have the same meaning as how they are generally understood by those of ordinary skill in the art to which the present disclosure pertains. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

A camera module according to an embodiment will be described with reference to FIG. 1.

A camera module 10 includes a fixed unit 100 and a movable unit 200.

The fixed unit 100 accommodates the movable unit 200 therein. As an example, a space 102 in which the movable unit 200 is accommodated is formed in the fixed unit 100. Another member, such as an actuator unit 300, may be mounted in the fixed unit 100. A coupling window 130 is an opening or a window that is formed on one side surface of the fixed unit 100. The fixed unit 100 is configured so that the movable unit 200 is movable therein. As an example, a first accommodating groove 140 and a second accommodating groove 142 to guide a movement of the movable unit 200 in an optical axis direction (Z axis direction in FIG. 1) is formed in the fixed unit 100. Rolling members 700 having a spherical shape are positioned in the first and second accommodating grooves 140 and 142.

The fixed unit 100 allows light refracted through a lens of the movable unit 200 to be incident onto an image sensor 510. As an example, an incident window 160 has a substantially rectangular or square shape and is formed at a bottom of the fixed unit 100.

The fixed unit 100 blocks permeation of foreign materials. As an example, a foreign material collecting groove 150 collects the foreign materials introduced through a gap between the fixed unit 100 and the movable unit 200 is formed in the bottom of the fixed unit 100. The foreign material collecting groove 150 is positioned at a circumference of the incident window 160 described above.

The fixed unit 100 also prevents pollution from a lubricant injected through the accommodating grooves 140 and 142. As an example, lubricant accommodating grooves 152, in which a lubricant flowing down through the accommodating grooves 140 and 142 is accommodated, is formed at the bottom of the fixed unit 100. The lubricant accommodating groove 152 is formed at portions facing the accommodating grooves 140 and 142.

The movable unit 200 forms an image of a subject on the image sensor. As an example, the movable unit 200 includes a plurality of lenses to capture and enlarge or reduce the image of the subject. For example, the movable unit 200 includes a plurality of lenses each having one of a positive refractive power and a negative refractive power. The movable unit 200 accommodates at least some of the rolling members 700 therein. As an example, a third accommodating groove 230 and a fourth accommodating groove 232 are formed on one side surface of the movable unit 200. The third and fourth accommodating grooves 230 and 232 are lengthily formed in the optical axis direction. The third and fourth accommodating grooves 230 and 232 face the first and second accommodating grooves 140 and 142 of the fixed unit 100, respectively. For example, the third and fourth accommodating grooves 230 and 232 of the movable unit 200 face the first and second accommodating grooves 140 and 142 of the fixed unit 100, respectively, with the rolling members 700 interposed therebetween. For reference, a lubricant to smoothly roll the rolling members 700 is applied in the respective accommodating grooves 140, 142, 230, and 232.

The movable unit 200 includes a lens barrel 210 and a barrel holder 220. The lens barrel 210 accommodates the plurality of lenses, and the barrel holder 220 accommodates a portion of an actuator unit 300 therein. The lens barrel 210 is mounted in the barrel holder 220.

In the movable unit 200 configured as described above, the lens barrel 210 and the barrel holder 220 are modular units, thus, any one of the lens barrel 210 and the barrel holder 220 is selectively replaced. As a result, repair related to a defect of the lens barrel 210 or the barrel holder 220 may be easily performed.

The camera module 10 includes the actuator unit 300 enabling active movement of the movable unit 200. As an example, the actuator unit 300 moves the movable unit 200 in the optical axis direction. Therefore, the camera module 10 adjusts a focal length through the actuator unit 300.

The actuator unit 300 includes a coil member 310 and a magnet member 320. The coil member 310 is positioned on the fixed unit 100. As shown in FIG. 1, the coil member 310 is positioned on a substrate unit 400 mounted on the fixed unit 100. The magnet member 320 is positioned on the movable unit 200, on a same side as a side of the substrate unit 400 including the coil member 310. Thus, the coil member 310 and the magnet member 320 face each other when built. As an example, the magnet member 320 is attached onto a side surface of the movable unit 200. Also, the side surface of the movable unit 200 is configured so that the magnet member 320 is easily attached thereonto. As an example, the side surface of the movable unit 200 is built or configured with a predetermined roughness so that a surface area thereof to which an adhesive may be applied is increased. As another example, fine grooves into which an adhesive may permeate may be formed in the side surface of the movable unit 200.

The magnet member 320 has a first polarity and a second polarity. As an example, one portion of the magnet member 320 has the first polarity, and another portion of the magnet member 320 has the second polarity. The first polarity and the second polarity of the magnet member 320 are arranged, positioned, or disposed in one direction. For example, the first polarity and the second polarity of the magnet member 320 are positioned in the optical axis direction or a movement direction of the movable unit.

The camera module 10 includes a component to control the actuator unit 300. As an example, the camera module 10 includes the substrate unit 400. The substrate unit 400 is positioned in the coupling window 130 of the fixed unit 100. The substrate unit 400 is connected to an image sensor unit 500. As shown in FIG. 1, connection pads 600 to electrically connect to the image sensor are formed on the substrate unit 400. The substrate unit 400 is connected to the coil member 310 of the actuator unit 300. As an example, a circuit printed on the substrate unit 400 is connected to the coil member 310.

The camera module 10 includes a sensor to sense a movement position of the movable unit 200. As an example, the camera module 10 includes a sensor member 800 sensing the movement position of the movable unit 200. The sensor member 800 is positioned on a side surface of the fixed unit 100. As an example, the sensor member 800 is positioned or disposed on a side surface of the fixed unit 100, on an adjacent side of the coupling window 130. However, a person skilled in the art would appreciate that the sensor member 800 may be positioned on a side surface of the fixed unit 100, which is opposite to the side of the coupling window 130. As a result, because the sensor member 800 is spaced apart from the coil member 310 and the magnet member 320 at a distance, the sensor member 800 is less affected by a magnetic field created between the coil member 310 and the magnet member 320. Therefore, according to an embodiment, a position of the movable unit 200 is accurately sensed by the sensor member 800. A magnetic body 810 sensed by the sensor member 800 is positioned on the movable unit 200. As an example, one or more magnetic bodies 810 is positioned on a side surface of the movable unit 200 facing the sensor member 800.

The sensor member 800 is firmly attached to the fixed unit 100. As an example, the sensor member 800 is adhered to the fixed unit 100 by an adhesive. As another example, the sensor member 800 is fused to the fixed unit 100 by an ultrasonic wave. In the latter case, a structure that may be fused to an edge of the sensor member 800 may be formed in the fixed unit 100. In another embodiment, the sensor member 800 is directly or indirectly connected to the fixed unit 100 using a mechanical or electrical connection.

In one example, the magnetic body 810 is a permanent magnet. For instance, the magnetic body 810 is a permanent magnet having an N pole and an S pole. The N pole and the S pole of the magnetic body 810 are positioned in one direction. As an example, the N pole and the S pole of the magnetic body 810 are positioned in the movement direction of the movable unit.

The rolling members 700 are positioned between the fixed unit 100 and the movable unit 200. As an example, the rolling members 700 are positioned between the accommodating grooves 140 and 142 of the fixed unit 100 and the accommodating grooves 230 and 232 of the movable unit 200. The rolling members 700 positioned as described above enable smooth movement of the movable unit 200.

The camera module 10 further includes a shield can 900. The shield can 900 protects the camera module 10 from harmful electromagnetic waves. As an example, the shield can 900 is formed of a metal that may easily shield against harmful electromagnetic waves. The shield can 900 is divided into a plurality of structural members. As an example, the shield can 900 includes a side surface cover 910 and an upper surface cover 920. The side surface cover 910 covers side surfaces of the camera module 10, and the upper surface cover 920 covers an upper surface (surface facing the subject) of the camera module 10.

The shield can 900 is firmly coupled to the fixed unit 100. As an example, a plurality of latches 912 and 922 are each engaged to latching protrusions 170, which include latches 172 and 174, of the fixed unit 100. The latches 912 and 922 are formed at the side surface cover 910 and the upper surface cover 920. Latches 914 and 924 respectively latch to latching protrusions 170 formed on an opposite side of the fixed unit 100. The latches 912, 914, 922, and 924 are formed in the vicinity of corners of the shield can 900. As an example, the latch 912 is formed in the vicinity of one corner of the side surface cover 910, and the latch 914 is formed in the vicinity of the other corner of the side surface cover 910 opposing one corner of the side surface cover 910. Therefore, the latch 912 and the latch 914 are positioned in a symmetrical form in relation to an optical axis. As another example, the latch 922 is formed in the vicinity of one corner of the upper surface cover 920, and the latch 924 is formed in the vicinity of the other corner of the upper surface cover 920 opposing one corner of the upper surface cover 920. Therefore, the latch 922 and the latch 924 are positioned in a symmetrical form in relation to an optical axis.

Long holes 916 are formed in the shield can 900. As an example, the long holes 916 exposing portions of the substrate unit 400 are formed in the side surface cover 910. The long holes 916 are lengthily formed from a lower end of the side surface cover 910 toward a proximity or a close proximity of an upper end of the side surface cover 910, in the optical axis direction.

The camera module 10 includes the image sensor unit 500. In an embodiment, the image sensor unit 500 converts an optical signal into an electrical signal. The image sensor unit 500 includes an image sensor 510, a printed circuit board 520, and a driving element 530. In addition, the image sensor unit 500 further includes connection terminals 522 and 524 connected, respectively, to the substrate unit 400 and the sensor member 800. As an example, a first connection terminal 522 connected to the sensor member 800 is formed on the printed circuit board 520. As another example, a second connection terminal 524 connected to the substrate unit 400 is formed on the printed circuit board 520.

Figure 2A:
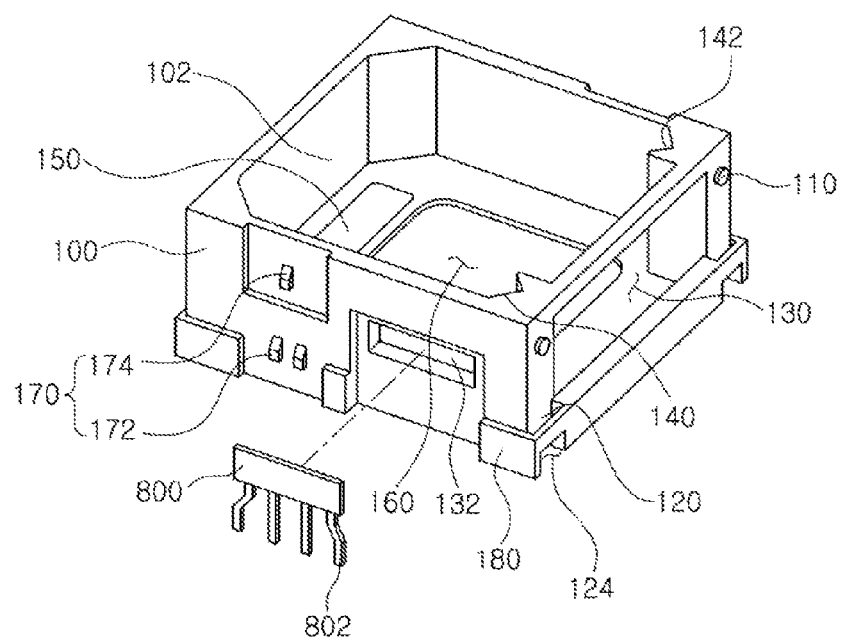
FIG. 2A is an enlarged view of a fixed unit illustrated in FIG. 1.

A detailed structure of the fixed unit 100 will be described with reference to FIG. 2A.

The fixed unit 100 is firmly coupled to the substrate unit 400. As an example, fitting grooves 120, into which portions of the substrate unit 400 are fitted, are formed in the fixed unit 100. As another example, protrusions 110 fitted into coupling grooves 410 of the substrate unit 400 are formed on the fixed unit 100.

The fixed unit 100 is configured to easily connect the substrate unit 400 and an external terminal to each other. To easily connect the substrate unit 400 to the external terminal, exposure holes 124 connected to the fitting grooves 120 are formed on a side surface of the fixed unit 100. The connection pads 600 of the substrate unit 400 are exposed to the exposure holes 124.

The fixed unit 100 may be coupled to the sensor member 800. As an example, a fitting window 132 into which the sensor member 800 is fitted, is formed in the side surface of the fixed unit 100.

Figure 2B:
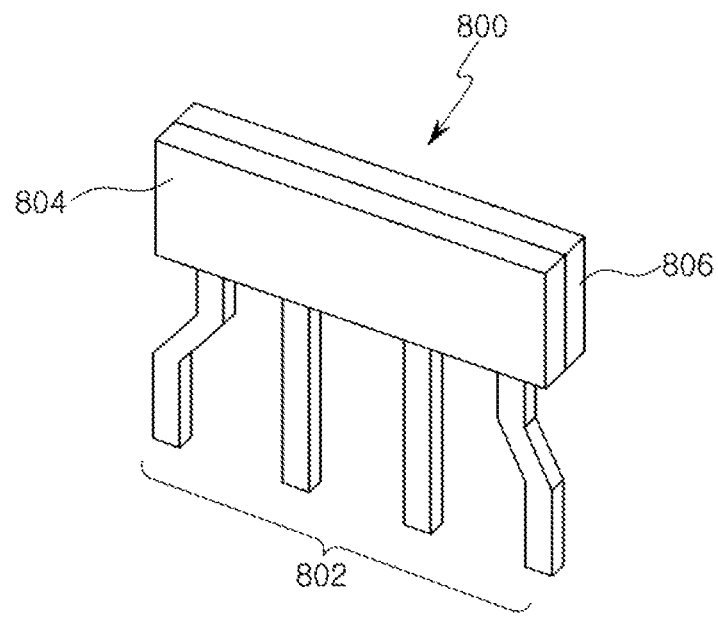
FIG. 2B is an enlarged perspective view of a sensor member illustrated in FIG. 1.

Next, the sensor member 800 will be described with reference to FIG. 2B.

The sensor member 800 includes a sensor body 804, terminals 802, and a fitting protrusion 806. The sensor body 804 is positioned on the side surface of the fixed unit 100. As an example, the sensor body 804 is connected, directly or indirectly, or attached to the side surface of the fixed unit 100 using an adhesive or other mechanical or electrical connections. The terminals 802 are formed at the sensor body 804. As an example, the terminals 802 are substantially extended from the sensor body 804 in the optical axis direction. The fitting protrusion 806 is formed on the sensor body 804. As an example, the fitting protrusion 806 protrudes from the sensor body 804 in a direction perpendicular to an extension direction of the terminals 802. For example, the fitting protrusions 806 protrudes in a direction perpendicular to the optical axis. The fitting protrusion 806 formed as described above fits into the fitting window 132 of the fixed unit 100 to enable the sensor member 800 and the fixed unit 100 to be firmly coupled to each other.

Figure 2C:
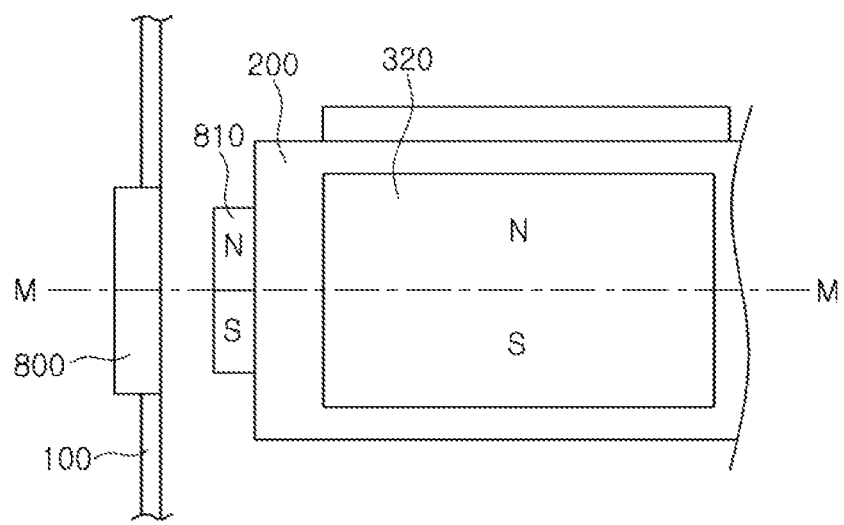
FIG. 2C is a side view of the camera module illustrating a position relationship between a sensor member, a magnetic body, and a magnet member illustrated in FIG. 1.

Next, a form in which the sensor member 800, the magnetic body 810, and the magnet member 320 are positioned will be described with reference to FIG. 2C.

The sensor member 800 is positioned to be at the same height as that of a neutral region of the magnetic body 810. As an example, the sensor member 800 is positioned so that a center thereof coincides with a point at which a first polarity N and a second polarity S of the magnetic body 810 are divided. The sensor member 800 positioned as described above accurately senses a position of the movable unit 200 moving along the optical axis direction (vertical direction in FIG. 2C) through a change in a position of the magnetic body 810.

The sensor member 800 is positioned at a same height as a height of a neutral region of the magnet member 320. As an example, the sensor member 800 is positioned so that the center thereof coincides with a point at which the first polarity N and the second polarity S of the magnet member 320 are divided. In another example, the sensor member 800 is positioned so that the center thereof coincides with both, the point at which the first polarity N and the second polarity S of the magnetic body 810 are divided, and the point at which the first polarity N and the second polarity S of the magnet member 320 are divided. For example, the center of the sensor member 800, the neutral region of the magnetic body 810, and the neutral region of the magnet member 320 are positioned along line M-M.

Generally, the substrate unit of the camera module includes circuits printed on both surfaces thereof. However, because the substrate unit having the embodiment described in FIGS. 2A through 2C has a high manufacturing cost and increased thickness, manufacturing costs of the camera module may be high and thinness and miniaturization of the camera module may be difficult to attain. In addition, in the substrate unit having the form described above, a defect due to an unexpected electrical connection between a coil and the printed circuits may occur.

Figure 3:
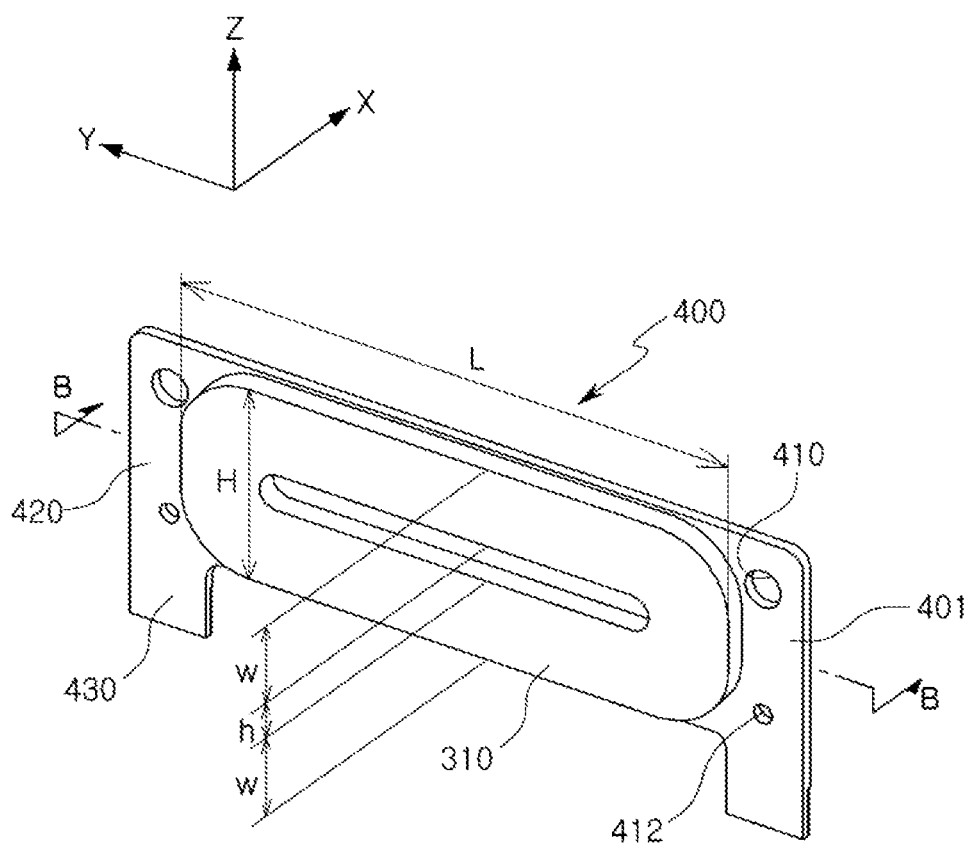
FIG. 3 is a front perspective view of a substrate unit illustrated in FIG. 1.
Figure 4:
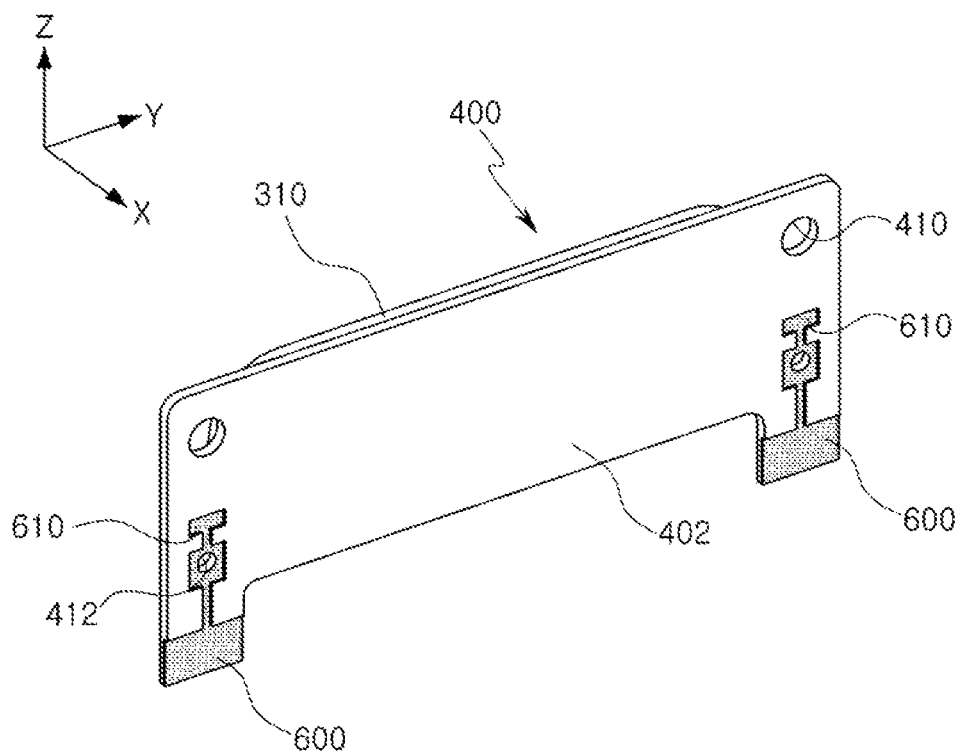
FIG. 4 is a rear perspective view of the substrate unit illustrated in FIG. 3.

Next, a structure of the substrate unit for solving these problems will be described with reference to FIGS. 3 and 4. First, a front structure of the substrate unit will be described with reference to FIG. 3.

The substrate unit 400 supports the coil member 310. As an example, the coil member 310 is positioned on a first surface 401 of the substrate unit 400. A circuit is not printed on the first surface 401 of the substrate unit 400 on which the coil member 310 is positioned. Therefore, the substrate unit 400, according to an embodiment, prevents an unnecessary electrical connection between the coil member 310 and the printed circuit.

The coupling holes 410 and withdrawal holes 412 are formed in the substrate unit 400. The coupling holes 410 are coupled to the protrusions 110 of the fixed unit 100. The withdrawal holes 412 allow portions of the coil member 310 to be withdrawn to a second surface 402 of the substrate unit 400.

The substrate unit 400 includes two or more structural parts. As an example, the substrate unit 400 includes a body part 420 and extension parts 430. The body part 420 provides a space on which the coil member 310 is positioned. The extension parts 430 are fitted into the fitting grooves 120 of the fixed unit 100.

The coil member 310 has a thin shape. For example, a height of the coil member 310, according to an embodiment, along the optical axis direction is significantly reduced. As an example, a winding width W of the coil member 310 is larger than a height h of a central hole formed by the coil member 310. In another example, the height h of the hole is smaller than ½ of the winding width W. In another example, a length L of the coil member 310 (in a direction perpendicular to the optical axis) is two or more times larger than a height H of the coil member 310 (in the optical axis direction). A person of ordinary skill in the relevant art will appreciate that the height of the coil member 310 may have alternative widths and lengths relative to the height of the coil member 310.

A rear structure of the substrate unit will be described with reference to FIG. 4.

The substrate unit 400 has a single sided substrate form. For example, the substrate unit 400 has a circuit that is printed only on the second surface 402. The connection pads 600 are formed on the second surface 402 of the substrate unit 400. As an example, the connection pads 600 formed on the extension parts 430 of the substrate unit 400 are connected to the connection terminals 522 of the image sensor unit 500. The connection pads 600 are connected to the coil member 310, for instance, through the withdrawal holes 412. For reference, the connection pads 600 and the coil member 310 are electrically connected to each other by a method, such as soldering.

Testing pads 610 are formed on the second surface 402 of the substrate unit 400. The testing pads 610 are connected to the connection pads 600, and provide a space in which test pins may contact.

Figure 5:
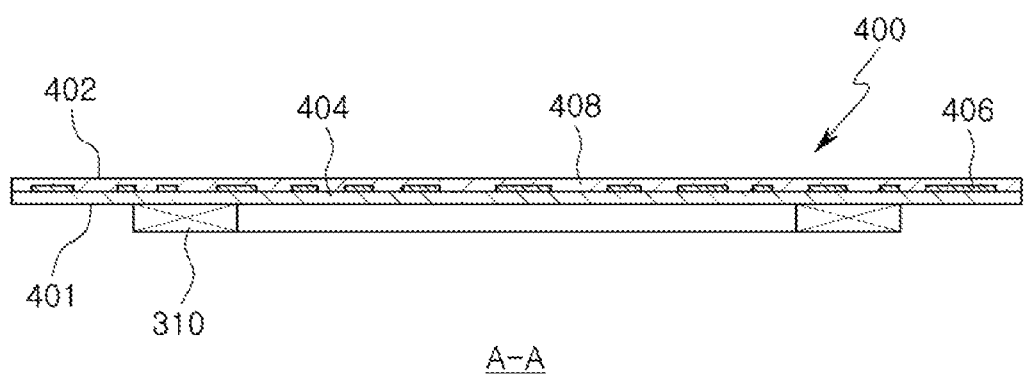
FIG. 5 is a cross-sectional view of the substrate unit illustrated in FIG. 3.

A cross-sectional structure of the substrate unit will be described with reference to FIG. 5.

The substrate unit 400 includes the circuit formed on only one surface thereof, as described above. As an example, a cross section of the substrate unit 400 includes a resin layer 404, a metal layer 406, and a protecting layer 408. The resin layer 404 forms a core of the substrate unit 400. In an example, the resin layer 404 is formed of a hard material. The metal layer 406 is formed on a second surface of the resin layer 404, and forms the connection pads 600 and the testing pads 610. The protecting layer 408 is formed on the second surface of the substrate unit 400, and covers the metal layer 406 so that a significant portion of the metal layer 406 is not externally exposed. In one embodiment, the significant portion of the metal layer 406 is greater than thirty-five percent of a surface area of the metal layer 406. In another embodiment, the significant portion of the metal layer 406 is greater than fifty percent of the metal layer 406.

In the substrate unit 400 configured as described above, the metal layer 406 is formed on one surface of the resin layer 404, and, as a result, the substrate unit 400 may be easily reduced in thickness and a manufacturing cost of the substrate unit 400 is reduced. In addition, in the substrate unit 400, according to an embodiment, the coil member 310 is positioned on a surface on which the metal layer is not formed to block an unnecessary contact between the coil member 310 and the circuit.

Figure 6:
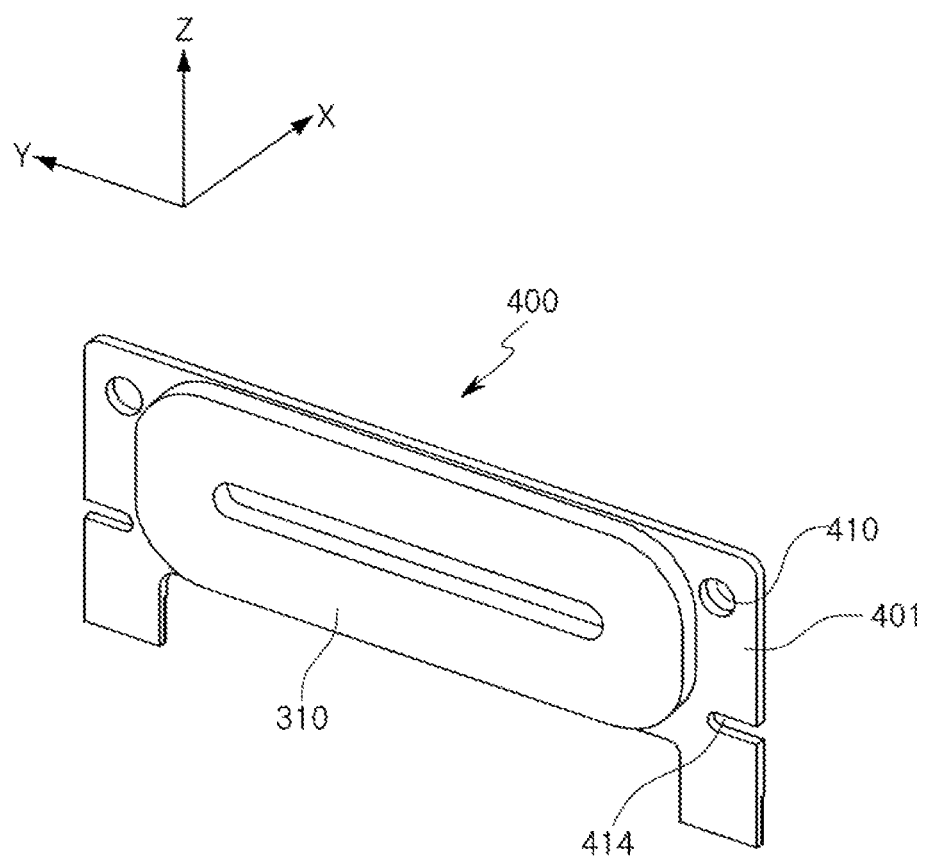
FIG. 6 is a front perspective view illustrating a modified form of the substrate unit illustrated in FIG. 3.
Figure 7:
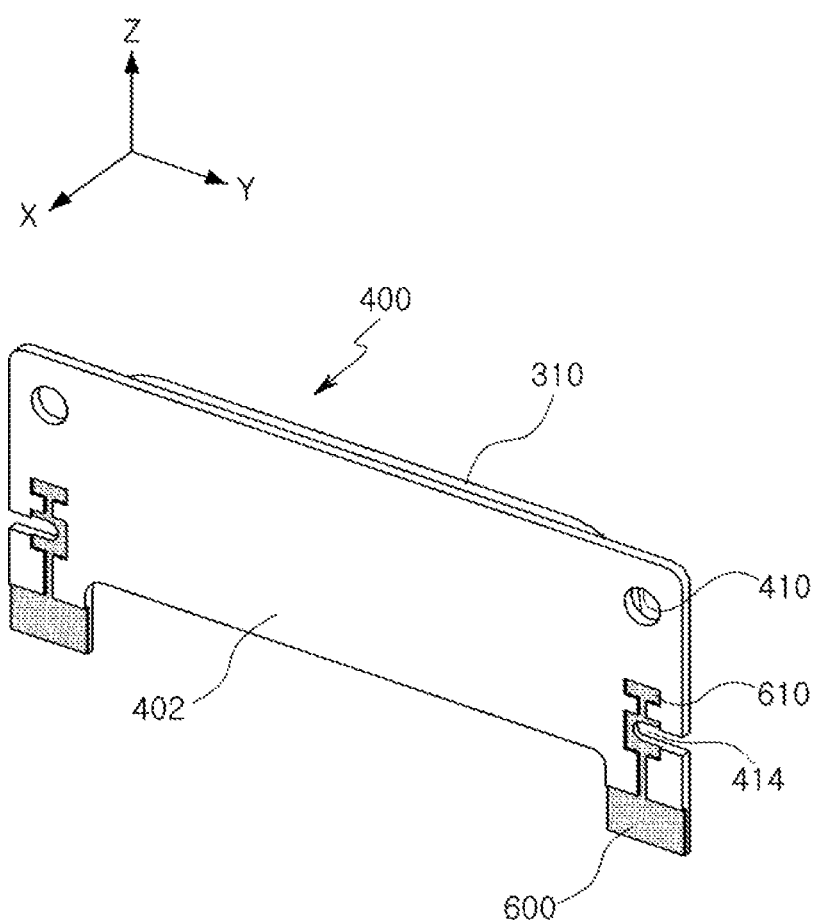
FIG. 7 is a rear perspective view of the substrate unit illustrated in FIG. 6.

Next, an alternative embodiment of the substrate unit will be described with reference to FIGS. 6 and 7.

The substrate unit 400, according to an alternative embodiment, is differs from the previously described embodiment in a component to withdraw the coil member 310 from the substrate unit. As an example, withdrawal grooves 414 to withdraw the coil member 310 are formed in the substrate unit 400.

In the substrate unit 400 configured as described above, portions of the coil member 310 move from the first surface 401 of the substrate unit 400 to the second surface 402 of the substrate unit 400 through the withdrawal grooves 414 opened to side surfaces of the substrate unit 400, thus, making it easy to withdraw the coil member 310.

Figure 8:
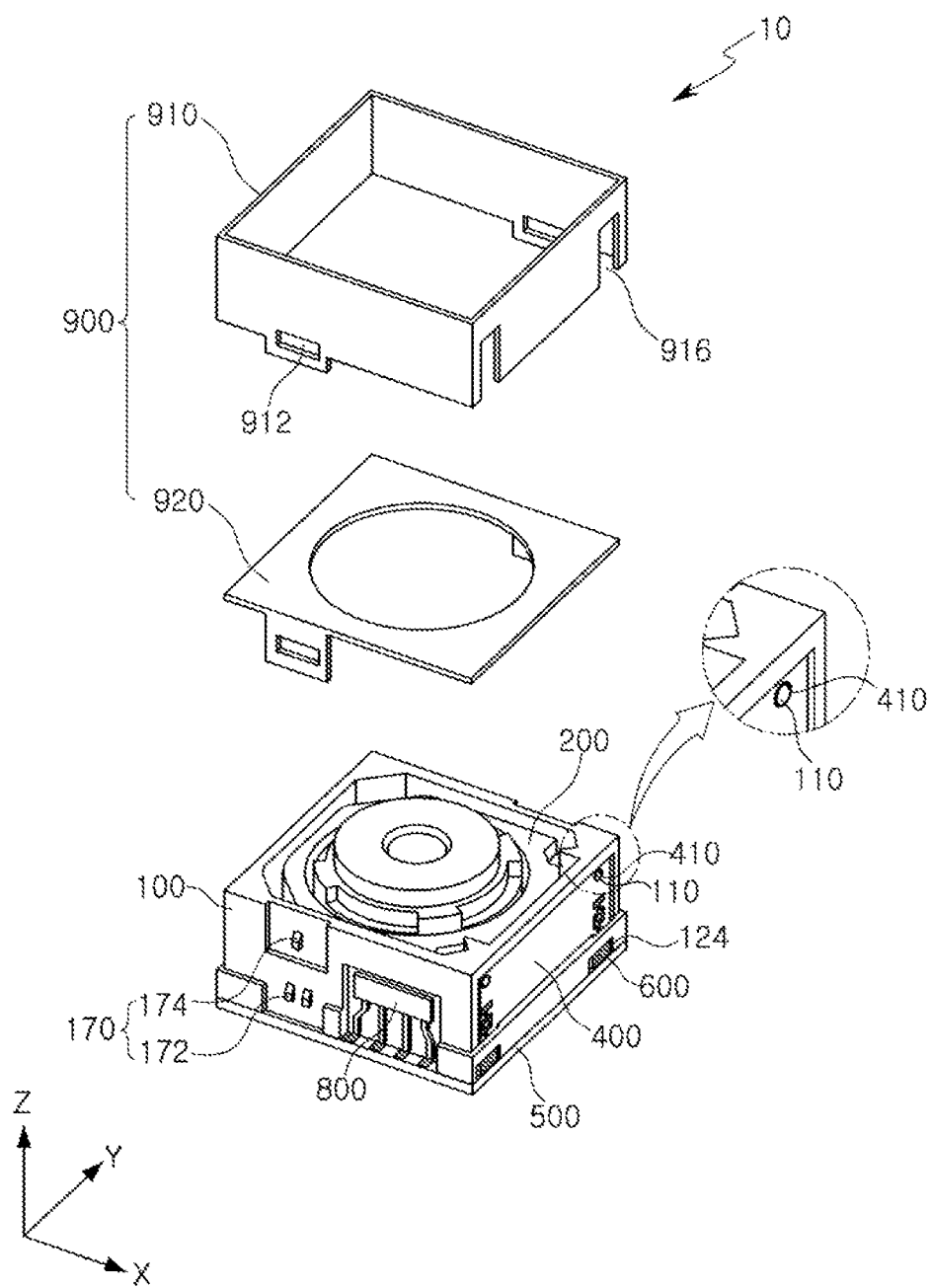
FIG. 8 is a partially assembled perspective view of the camera module illustrated in FIG. 1.

A partially assembled form of the camera module, according to an embodiment, will be described with reference to FIG. 8.

The camera module 10 is thin. As an example, the camera module 10 is configured so that the movable unit 200 is positioned in the fixed unit 100. As another example, the camera module 10 is configured so that separation of the movable unit 200 is prevented by the shield can 900. As another example, the camera module 10 is configured so that the substrate unit 400 is positioned on a side surface of the fixed unit 100.

The substrate unit 400 is coupled to the protrusions 110 of the fixed unit 100. The protrusions 110 of the fixed unit 100 are coupled to the holes 410 of the substrate unit 400 to prevent separation of the substrate unit 400 and align a position of the substrate unit 400.

The substrate unit 400 is formed so that the coil member 310 faces the movable unit 200. As an example, the connection pads 600 of the substrate unit 400 are externally exposed through the exposure holes 124 in a state in which the connection pads 600 are mounted on the fixed unit 100.

Figure 9:
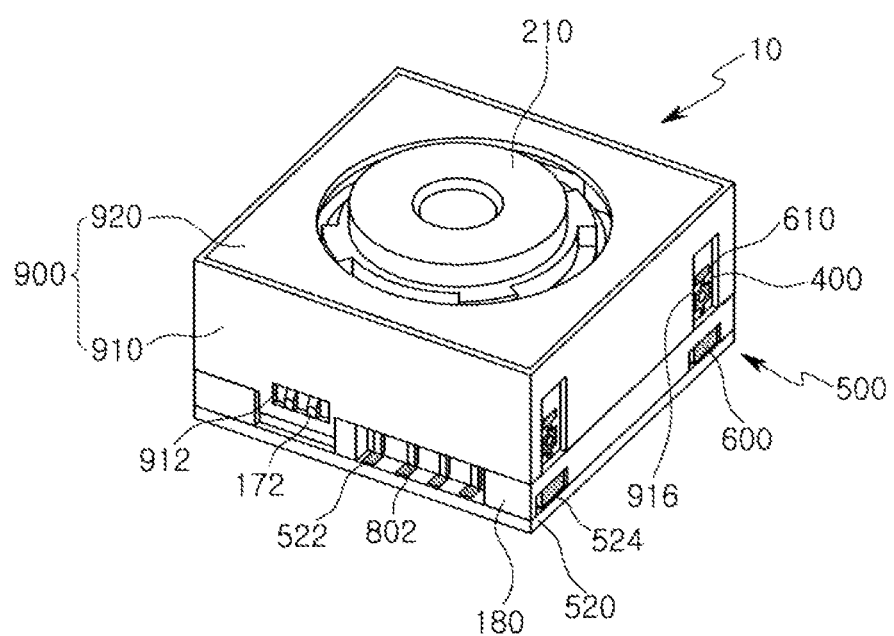
FIG. 9 is an assembled perspective view of the camera module illustrated in FIG. 8.

An assembled form of the camera module, according to an embodiment, will be described with reference to FIG. 9.

The camera module 10 is configured so that the substrate unit 400 and the printed circuit board 520 are easily connected to each other. As an example, the connection pads 600 of the substrate unit 400 and the connection terminals 524 of the printed circuit board 520 easily contact each other by coupling the fixed unit 100 and the image sensor unit 500 to each other. The connection pads 600 of the substrate unit 400 and the connection terminals 524 of the printed circuit board 520 are exposed to a side surface of the camera module 10. Therefore, the connection pads 600 of the substrate unit 400 and the connection terminals 524 of the printed circuit board 520 easily connect to each other by soldering.

The camera module 10 is configured so that the sensor member 800 and the printed circuit board 520 easily connect to each other. As an example, the terminals 802 of the sensor member 800 and the connection terminals 522 of the printed circuit board 520 easily contact each other by coupling the fixed unit 100 and the image sensor unit 500 to each other. The terminals 802 of the sensor member 800 and the connection terminals 522 of the printed circuit board 520 are exposed to a side surface of the camera module 10. Therefore, the terminals 802 of the sensor member 800 and the connection terminals 522 of the printed circuit board 520 easily connect to each other by soldering.

The camera module 10 is configured so that the connection pads 600 and the terminals 802 are not covered by the shield can 900. As an example, steps 180 of the fixed unit 100 define a position at which the shield can 900 is mounted so that the shield can 900 does not cover the connection pads 600 and the terminals 802.

The camera module 10 is configured so that a quality test thereof is easily performed. Generally, the quality test of the camera module 10 is performed by connecting test pins to the connection pads 600. However, when solders are formed on the connection pads 600, a reliable contact may be difficult to attain between the solders having a hemispherical shape and the test pins. In accordance with an embodiment, the testing pads 610 connected to the connection pads 600 are formed in order to solve this problem. Therefore, in the camera module 10, according to an embodiment, reliability of an electrical connection between the connection pads 600 and the test pins is improved through the testing pads 610.

Next, a camera module according to another embodiment will be described. For reference, in the following description for another embodiment, components that are the same as those of the camera module, according to an embodiment, described above will be denoted by the same reference numerals, and a description thereof will be omitted.

Figure 10A:
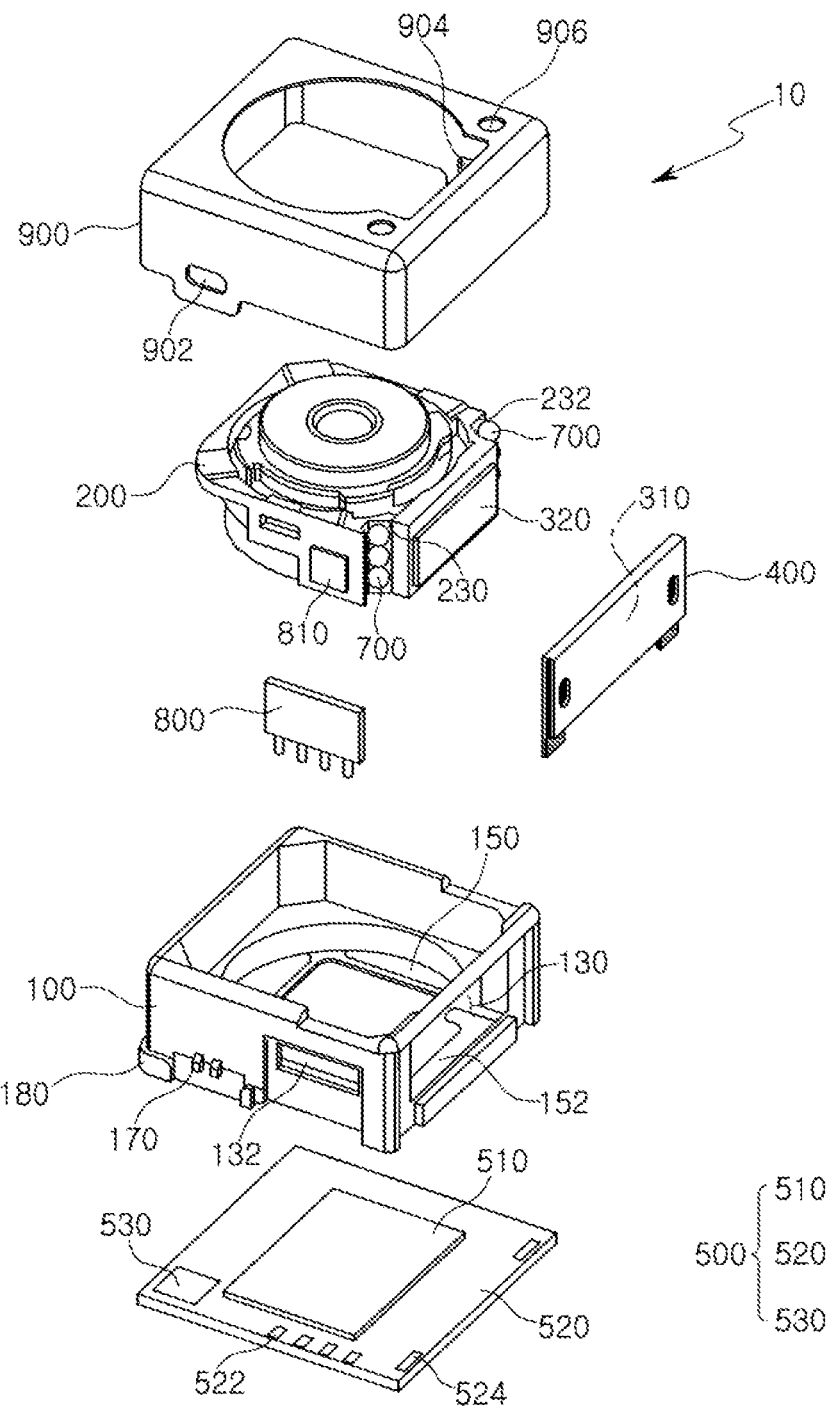
FIG. 10A is a partially exploded perspective view of a camera module, according to another embodiment.

A camera module, according to another embodiment, will be described with reference to FIG. 10A.

A camera module 10, according to an embodiment, differs in a configuration of the shield can 900 from the camera module 10, according to the previously described embodiment. As an example, the shield can 900, according to an embodiment, has a structural configuration in which the side surface cover 910 and the upper surface cover 920 are integrated with each other. The shield can 900 may be easily manufactured and assembled.

The shield can 900 includes a component coupled to the fixed unit 100. As an example, the shield can 900 includes a latch 902 coupled to the latching protrusion 170 of the fixed unit 100. The shield can 900 includes a component to prevent separation of the rolling members 700. As an example, a plurality of pressing protrusions 906 extended downwardly (in FIG. 10) in the optical axis direction are formed on an upper surface of the shield can 900.

The pressing protrusions 906 are positioned facing the rolling members 700 positioned in the respective accommodating grooves 230 and 232. As an example, the pressing protrusions 906 extend inwardly from the accommodating grooves 230 and 232 and contact the rolling members 700. The pressing protrusions 906 positioned as described above effectively block the rolling members 700 from being separated from the accommodating grooves 230 and 232.

The pressing protrusions 906 are formed through press working. As an example, the pressing protrusion 906 are formed integrally with the shield can 900 when the shield can 900 is manufactured through press forming. However, a person of skill in the relevant art will appreciate that other forming processes may be used to form the pressing protrusions 906, such as molding.

The camera module 10, according to an embodiment, has a different configuration of the substrate unit 400 from the camera module 10 described above, according to an embodiment. As an example, the substrate unit 400, according to an embodiment is folded in the vertical direction. As another example, the substrate unit 400 according to an embodiment, is configured so that the coil member 310 and the connection pads 600 are positioned on the same surface. A structure of the substrate unit 400 will be described in detail below. As another example, the substrate unit 400, according an embodiment, has a structural configuration in which circuits are printed on both surfaces thereof. For example, the substrate unit 400, according to an embodiment, has a structural configuration in which the coil member and a printed circuit connected to the coil member are formed on one surface thereof and a printed circuit and the connection pads are formed on the other surface thereof.

The fixed unit 100 is configured so that the sensor member 800 is easily mounted. As an example, a fitting window 132 to mount the sensor member 800 is formed on a side surface of the fixed unit 100.

Figure 10B:
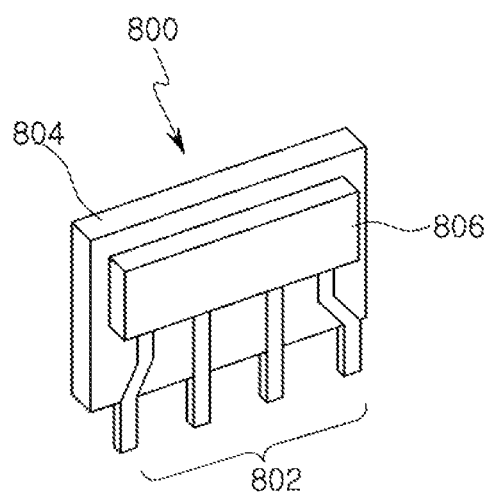
FIG. 10B is a front perspective view of a sensor member illustrated in FIG. 10A.
Figure 10C:
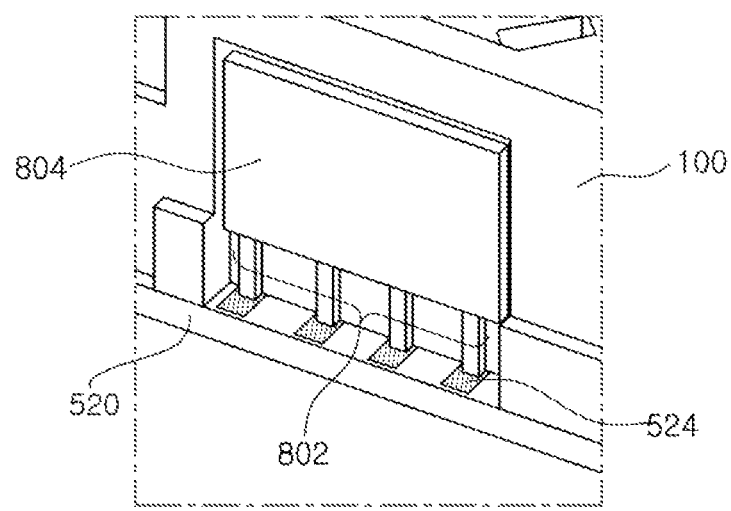
FIG. 10C is an assembled perspective view of a fixed unit and the sensor member.

Next, the sensor member will be described with reference to FIGS. 10B and 10C.

The sensor member 800 includes a sensor body 804, terminals 802, and a fitting protrusion 806. The sensor body 804 is positioned on the side surface of the fixed unit 100. As an example, the sensor body 804 is attached to the side surface of the fixed unit 100 by an adhesive. The terminals 802 are formed on the sensor body 804. As an example, the terminals 802 substantially extend from the sensor body 804, in the optical axis direction. The fitting protrusion 806 are formed on the sensor body 804. As an example, the fitting protrusion 806 protrudes from the sensor body 804 in a direction perpendicular to an extension direction of the terminals 802. For example, the fitting protrusions 806 protrude in a direction perpendicular to the optical axis. The fitting protrusion 806 formed as described above may be fitted into the fitting window 132 of the fixed unit 100 to enable the sensor member 800 and the fixed unit 100 to be firmly coupled to each other. In one embodiment, the fitting protrusion 806 is smaller than the sensor body 804. In an alternative embodiment, the fitting protrusion 806 is greater than or equal to the sensor body 804.

Because the sensor member 800 configured as described above may be positioned to be close to the magnetic body 810 of the movable unit 200, the sensor member 800 accurately senses a position of the movable unit 200 through the magnetic body 810.

Figure 11:
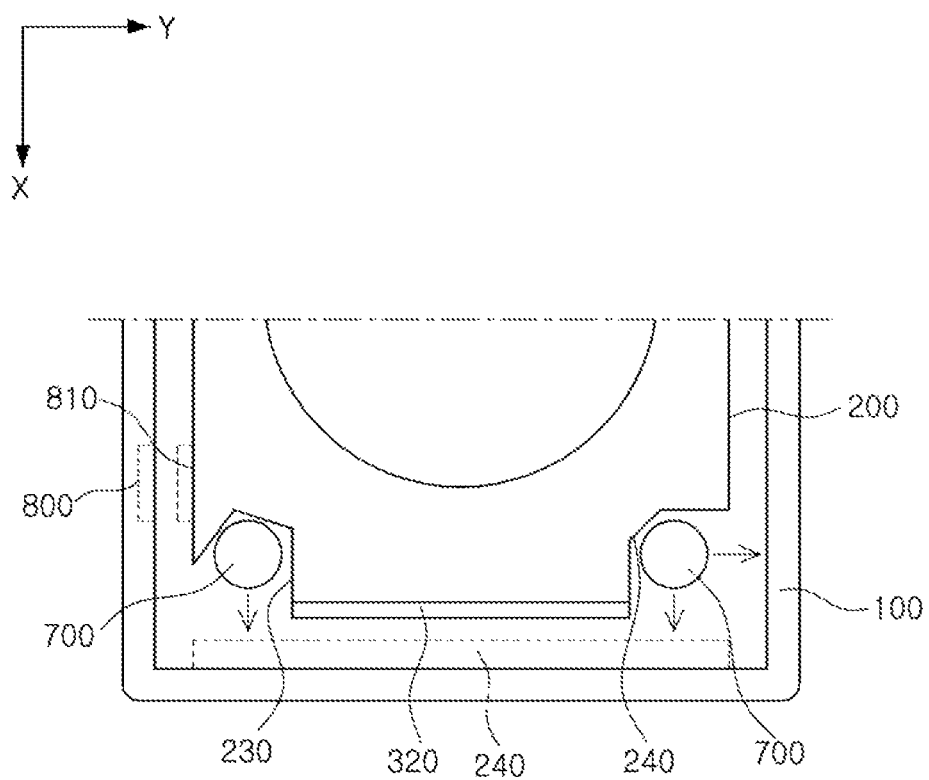
FIG. 11 is a plan view of a movable unit illustrated in FIG. 10A.

A coupling structure between the movable unit 200 and the rolling members 700 will be described with reference to FIG. 11.

The movable unit 200 relatively moves with respect to the fixed unit 100. As an example, the movable unit 200 moves in the optical axis direction. The rolling members 700 are configured to smooth a movement of the movable unit 200. As an example, the rolling members 700 are positioned in the accommodating grooves 230 and 232 of the movable unit 200.

The accommodating grooves 230 and 232 ensure a degree of freedom in the layout of the rolling members 700. As an example, the accommodating groove 230 opens in a first direction (X axis direction in FIG. 11), and the accommodating groove 232 opens in first and second directions (X and Y axis directions in FIG. 11). The accommodating grooves 230 and 232 having the structural configuration as described above, may enable alignment of a position of the movable unit 200 in the first and second directions. As an example, a position of the movable unit 200 in the X axis direction is aligned by the coil member 310 and the magnet member 320. As another example, a position of the movable unit 200 in the Y axis direction is aligned by the sensor member 800 and the magnetic body 810. Therefore, in the camera module 10, according to an embodiment, the position of the movable unit 200 with respect to the fixed unit 100 may be very easily aligned, and an optical axis of the movable unit 200 and an optical axis of the image sensor unit 500 may be aligned with each other.

Figure 12:
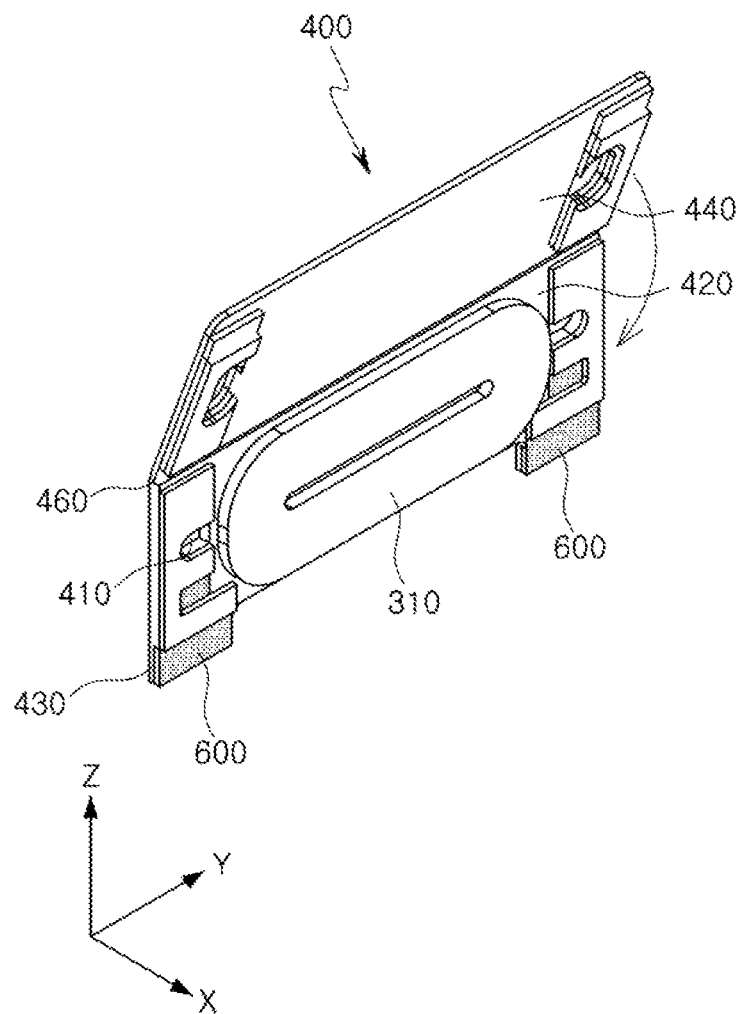
FIG. 12 is a deployed perspective view of a substrate unit illustrated in FIG. 10A.

A structure of the substrate unit will be described in detail with reference to FIG. 12.

The substrate unit 400, according to an embodiment, is folded in a vertical direction. As an example, the substrate unit 400 is folded in relation to an axis (Y axis in FIG. 12) perpendicular to the optical axis.

The substrate unit 400 includes a body part 420 and a cover part 440. The body part 420 and the cover part 440 are positioned in the optical axis direction (Z axis direction in FIG. 12). The body part 420 occupies a significant portion of the substrate unit 400. The significant portion is more than fifty-percent of the structural embodiment of the substrate unit 400. As an example, the coil member 310 and the connection pads 600 are formed on the body part 420. As another example, a metal layer to connect the coil member 310 and the connection pads 600 to each other is formed on the body part 420. The cover part 440 enables electrical insulation of the coil member 310. As an example, the cover part 440 includes only a resin layer or a resin layer and a protecting layer. The cover part 440 covers at least a portion of the body part 420. As an example, the cover part 440 folds on the body part 420 in relation to a separation groove 460. The cover part 440, configured as described above, blocks contact between the coil member 310 disposed on the body part 420 and other electrical and electronic components.

The substrate unit 400 includes extension parts 430. As an example, a pair of extension parts 430 extended in one direction are formed at the body part 420. The connection pads 600 may be formed on the extension parts 430. The extension parts 430 are lengthily formed so as not to be covered by the cover part. Therefore, the connection pads 600 formed on the extension parts 430 are externally exposed even in a state in which the body part 420 is covered by the cover part 440.

The substrate unit 400 has the separation groove 460 formed therein. As an example, the substrate unit 400 has the separation groove 460 formed therein in order to visibly separate the body part 420 and the cover part 440 from each other. The separation groove 460 enables the substrate unit 400 to be folded. In an embodiment, the separation groove 460 is a smallest thickness portion of the substrate unit 400. As another example, a ductile material is positioned in the separation groove 460. For example, a metal, such as copper, is formed in the separation groove 460 to allow a folded state of the substrate unit 400 to be stably maintained.

The substrate unit 400 has holes formed therein. As an example, holes 410 and 412 into which the protrusions 110 of the fixed unit 100 are fitted are formed in the body part 420 and the cover part 440. The holes 412 of the cover part 440 have a large size. As an example, the holes 412 of the cover part 440 have a size large enough to visibly expose the testing pads 610 of the body part 420.

Figure 13:
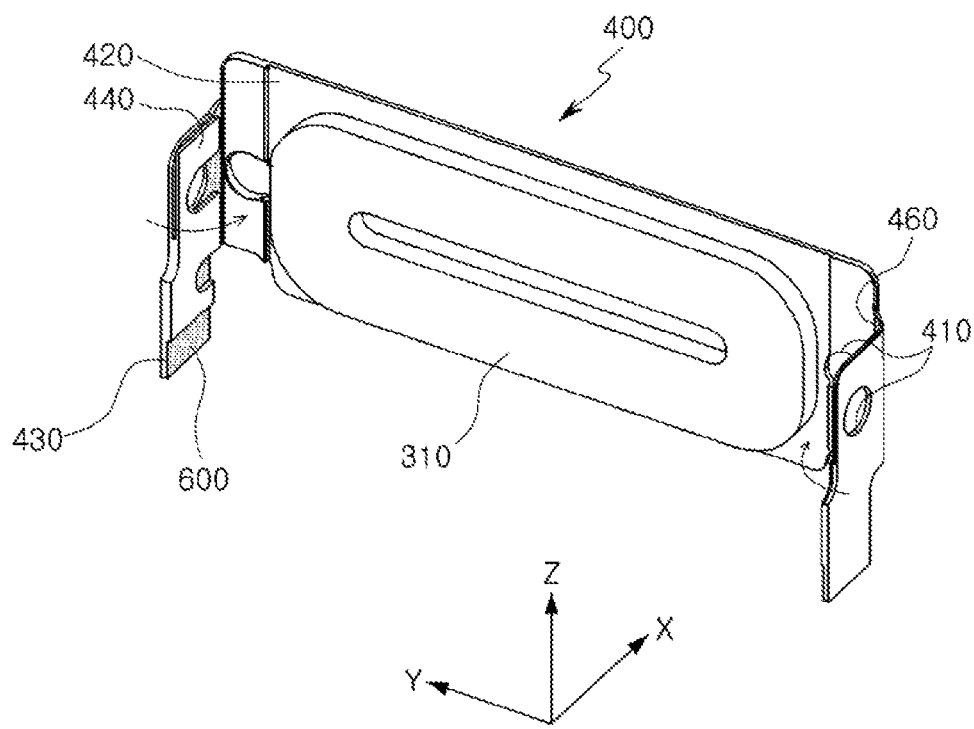
FIG. 13 is a deployed perspective view of a substrate unit, according to another embodiment.

Next, a substrate unit according to another embodiment will be described with reference to FIG. 13.

A substrate unit 400, according to an embodiment, is different in disposition of the body part 420 and the cover part 440 from the substrate unit described above. As an example, the cover parts 440 are positioned on both sides of the body part 420. As another example, the body part 420 and the cover parts 440 are positioned in the direction (Z axis direction in FIG. 13) perpendicular to the optical axis.

The cover parts 440 are folded on the body part 420 in relation to the optical axis. The extension parts 430 are formed on the cover parts 440. As an example, portions of the cover parts 440 are lengthily extended downwardly, compared to the body part 420. The connection pads 600 and the testing pads 610 are formed on the extension parts 430. Therefore, even though the cover parts 440 are folded on the body part 420, the connection pads 600 and the testing pads 610 of the extension part 430 are externally exposed from the body part 420.

Figure 14:
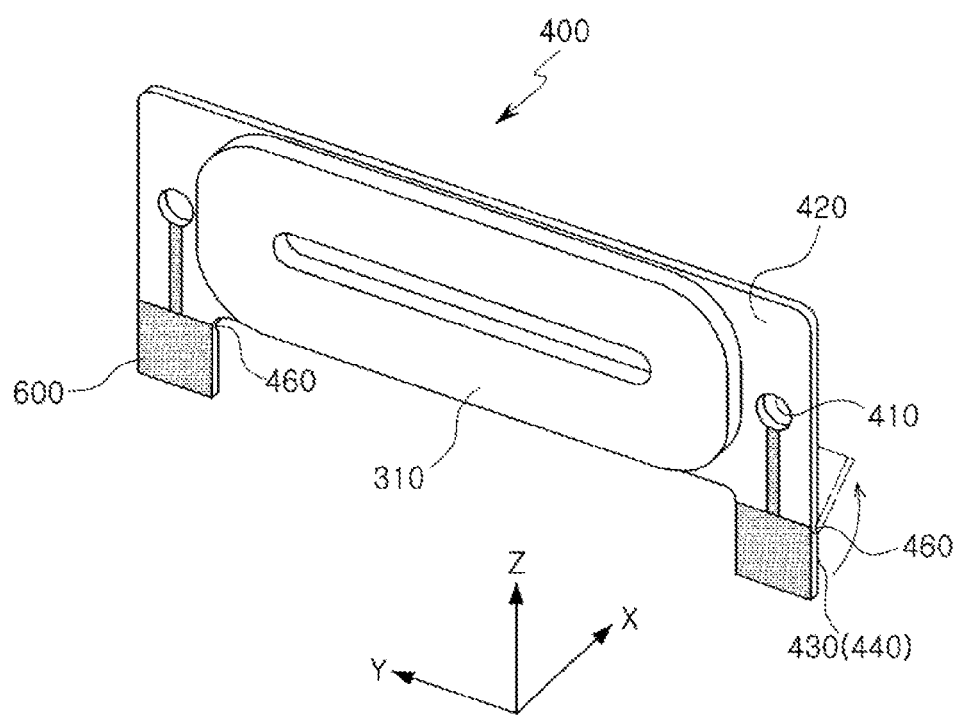
FIG. 14 is a deployed perspective view of a substrate unit, according to another embodiment.

Next, a substrate unit, according to another embodiment, will be described with reference to FIG. 14.

A substrate unit 400, according to an embodiment, is different in disposition of the body part 420 and the cover part 440 from the substrate unit described above. As an example, the cover part 440 is positioned below the body part 420. As an example, the cover part 440 has a structural shape similar to the structural shape of the extension parts 430 extending downwardly from the body part 420.

The cover part 440 folds toward the rear of the body part 420. Therefore, the coil member 310 is positioned on one surface of the substrate unit 400, and the connection pads 600 is positioned on the other surface of the substrate unit 400.

Figure 15:
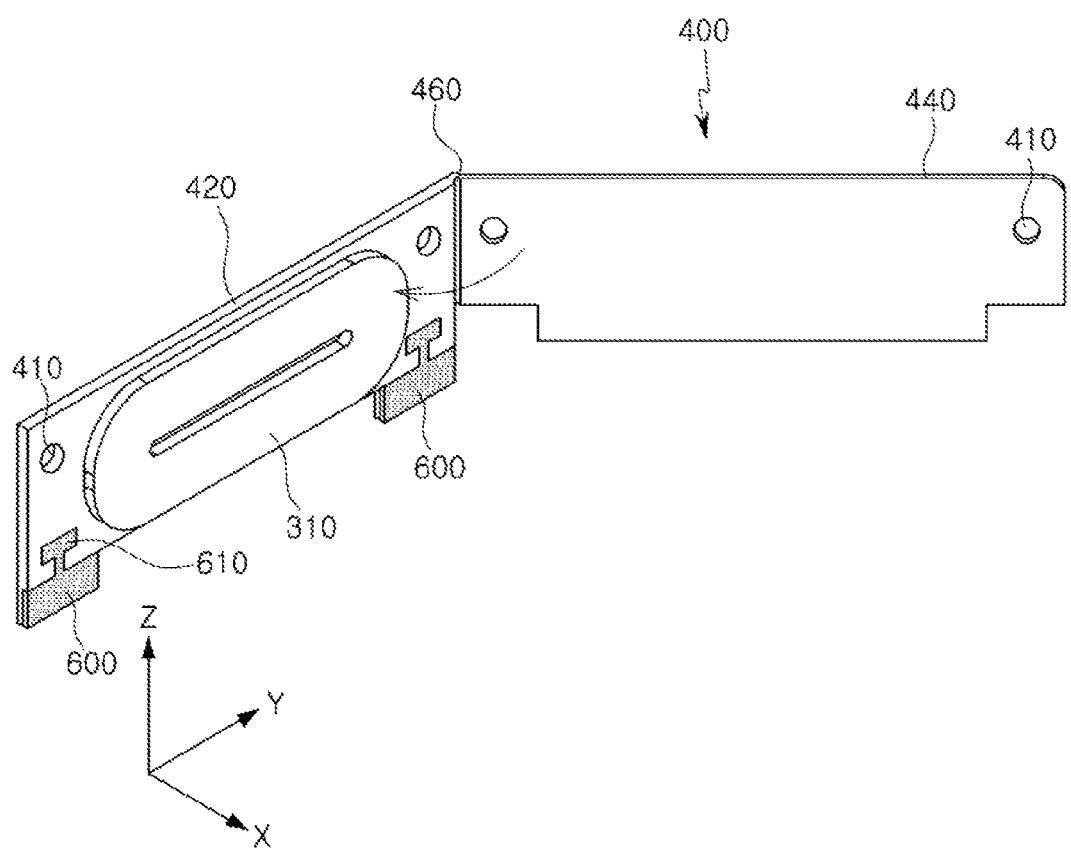
FIG. 15 is a deployed perspective view of a substrate unit, according to another embodiment.

Next, a substrate unit, according to another embodiment, will be described with reference to FIG. 15.

A substrate unit 400, according to an embodiment, has a different structural configuration of the body part 420 and the cover part 440 from the substrate unit described above. As an example, the body part 420 and the cover part 440 are positioned in a direction perpendicular to the optical axis. The extension parts 430 are formed at the body part 420. The connection pads 600 and the testing pads 610 are formed on the extension parts 430. The cover part 440 covers a significant portion of the body part 420. As an example, the cover part 440 has a size large enough to completely cover the coil member 310 of the body part 420. As another example, portions of the cover part 440 are cut to externally expose the extension parts 430.

Figure 16:
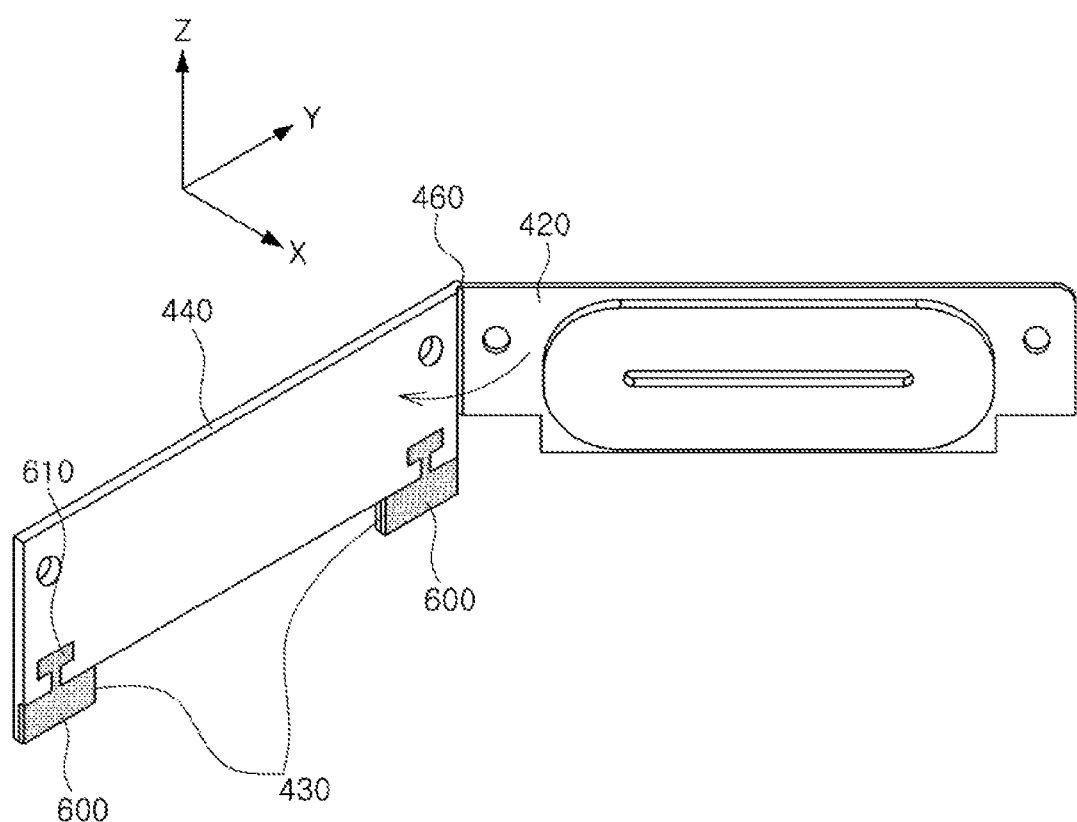
FIG. 16 is a deployed perspective view of a substrate unit, according to another embodiment.

Next, a substrate unit, according to another embodiment, will be described with reference to FIG. 16.

A substrate unit 400, according to an embodiment, has a different structural configuration of the extension parts 430 from the substrate unit described above. As an example, the extension parts 430 are formed on the cover part 440.

The substrate unit 400, according to an embodiment, has a different structural configuration of the coil member 310 and the connection pads 600 from the substrate unit described above. As an example, the coil member 310 are positioned on the body part 420, and the connection pads 600 are positioned on the cover part 440.

In the substrate unit 400, configured as described above, a sufficient amount of space for the coil member 310 and the connection pads 600 are provided.

Figure 17A:
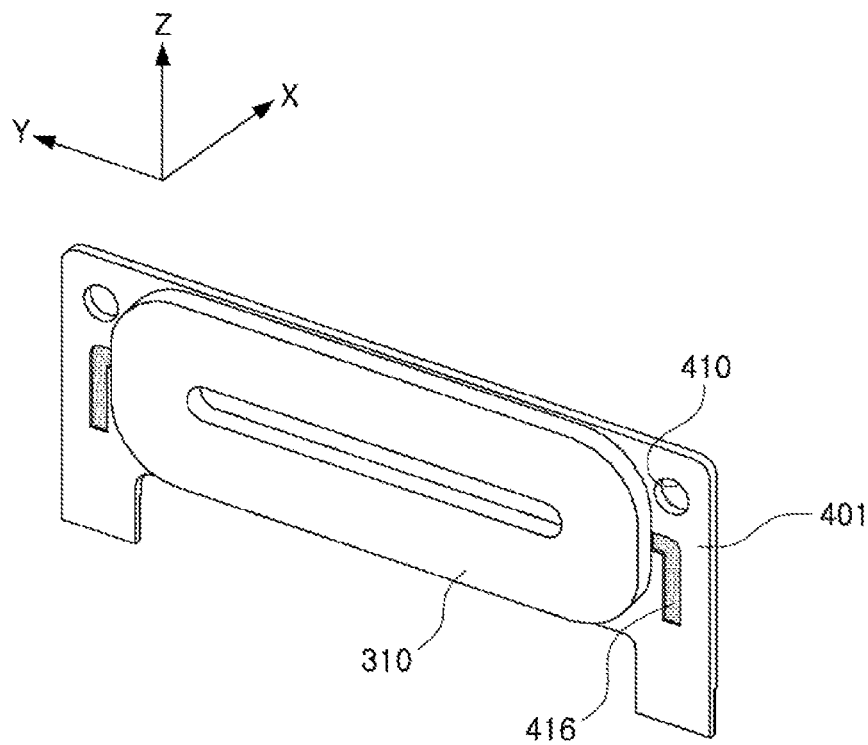
FIGS. 17A and 17B are, respectively, a front perspective view and a rear perspective view of a substrate unit, according to another embodiment.
Figure 17B:
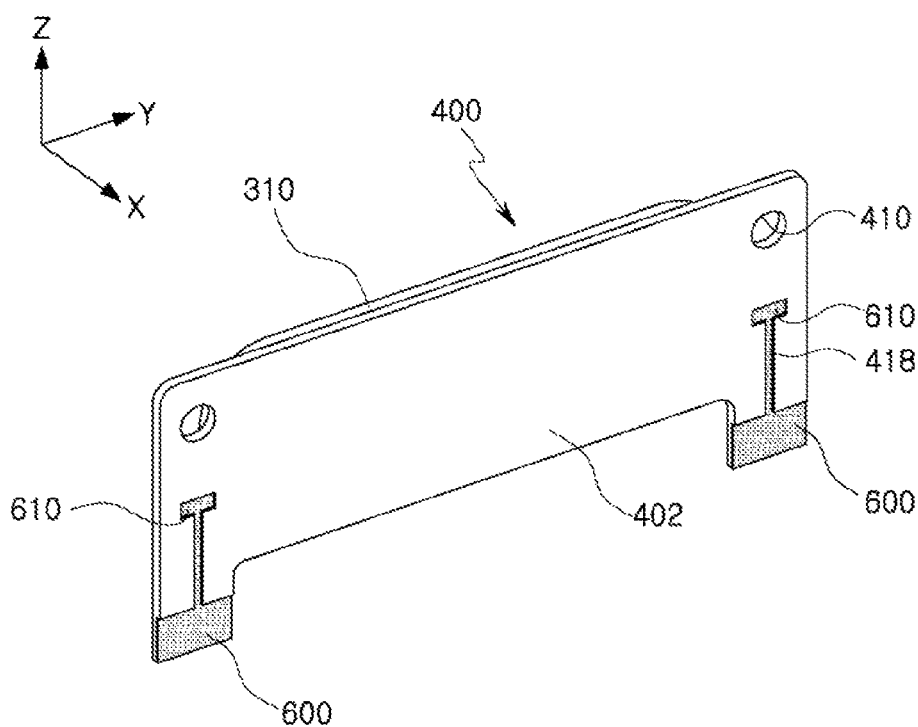

Next, a substrate unit, according to another embodiment, will be described with reference to FIGS. 17A and 17B.

A substrate unit 400, according to an embodiment, includes a substrate having circuits printed on both surfaces thereof. As an example, circuits 416 connected to the coil member 310 are formed on a first surface 401 of the substrate unit 400, and circuits 418 connected to the connection pads 600 are formed on a second surface 402 of the substrate unit 400. In an embodiment, the circuits 416 formed on the first surface 401 and the circuits 418 formed on the second surface 402 are connected to each other by via electrodes.

In the substrate unit 400, configured as described above, has a easy to build structural configuration and connection between the coil member 310 and the connection pads 600.

As set forth above, according to various embodiments, an actuator is easily mounted and connected.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
a coil positioned on a first surface of a fixed unit;
a magnet positioned on a movable unit and facing the coil; and
a position sensor positioned on a second surface of the fixed unit and configured to sense a position of the movable unit,
wherein the first and second surfaces are transverse to each other, and the second surface lacks coils disposed thereon.

2. The camera module of claim 1, wherein the first and second surfaces are orthogonal to each other.

3. The camera module of claim 1, wherein a fitting window into which the position sensor is fitted is formed on the second surface of the fixed unit.

4. The camera module of claim 1, wherein the position sensor comprises terminals extended in one direction.

5. The camera module of claim 1, wherein the position sensor comprises a protrusion part coupled to the fixed unit.

6. The camera module of claim 1, further comprising:
a magnetic body positioned on the movable unit configured to face the position sensor.

7. The camera module of claim 1, further comprising:
an image sensor configured to convert an optical signal incident through lenses of the movable unit into an electrical signal.

8. A camera module, comprising:
a fixed unit comprising a coupling window formed on a first side surface thereof and comprising a fitting window formed on a second side surface thereof;
a moveable unit accommodated in a space of the fixed unit;
an actuator configured to move the movable unit in an optical axis direction;
a substrate unit positioned in the coupling window and comprising a coil of the actuator positioned thereon; and
a position sensor positioned in the fitting window and configured to sense a movement position of the movable unit,
wherein the first side surface and the second side surface are transverse to each other, and the fitting window lacks coils disposed therein.

9. The camera module of claim 8, wherein the first and second side surfaces are orthogonal to each other in the fixed units.

10. The camera module of claim 8, wherein the first and second side surfaces are adjacent to each other in the fixed unit.

11. The camera module of claim 8, wherein the first and second side surfaces are opposite to each other in the fixed unit.

12. The camera module of claim 8, further comprising:
a magnetic body positioned on the movable unit and configured to generate a magnetic force line sensed by the position sensor.

13. The camera module of claim 8, wherein the position sensor comprises:
a sensor body,
terminals extended from the sensor body, and
a fitting protrusion extended from the sensor body in a direction perpendicular to the terminals.

14. The camera module of claim 8, wherein the position sensor is positioned at a same height as that of a magnet of the actuator.

15. The camera module of claim 8, further comprising:
an image sensor connected to the position sensor.

* * * * *